US008681350B2

(12) United States Patent
Armstrong

(10) Patent No.: US 8,681,350 B2
(45) Date of Patent: Mar. 25, 2014

(54) SYSTEMS AND METHODS FOR ENTERPRISE SHARING OF A PRINTING DEVICE

(75) Inventor: Charles Thomas Armstrong, Rancho Santa Margarita, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 13/408,750

(22) Filed: Feb. 29, 2012

(65) Prior Publication Data

US 2013/0222839 A1    Aug. 29, 2013

(51) Int. Cl.
*G06K 15/00* (2006.01)
*G06F 3/12* (2006.01)

(52) U.S. Cl.
USPC .................................. 358/1.14; 358/1.15

(58) Field of Classification Search
USPC .......... 358/1.1, 1.9, 1.14, 1.15, 402; 709/201, 709/203, 219; 382/100, 112, 115
See application file for complete search history.

(56) References Cited

U.S. PATENT DOCUMENTS

| | | | |
|---|---|---|---|
| 6,601,102 B2 * | 7/2003 | Eldridge et al. | 709/229 |
| 7,711,648 B2 * | 5/2010 | Howard et al. | 705/59 |
| 7,966,644 B2 * | 6/2011 | Noda et al. | 726/1 |
| 2008/0060061 A1 | 3/2008 | Deshpande | |
| 2008/0244712 A1 | 10/2008 | Kitada | |
| 2010/0146611 A1 | 6/2010 | Kuzin | |
| 2011/0090529 A1 | 4/2011 | Hertling | |
| 2011/0176162 A1 | 7/2011 | Kamath | |
| 2011/0235085 A1 | 9/2011 | Jazayeri | |
| 2013/0027741 A1 * | 1/2013 | Liu | 358/1.15 |
| 2013/0085968 A1 * | 4/2013 | Schultz et al. | 705/400 |

FOREIGN PATENT DOCUMENTS

JP    2010-074420 A    4/2010
JP    2011-198017 A    10/2011

OTHER PUBLICATIONS

Lexmark Mobile Print Solutions for Enterprise, downloaded Feb. 2012.
Lexmark Mobile Printing White Paper, downloaded Feb. 2012.
Lexmark Google Cloud Print ESF App, downloaded Feb. 2012.
Diego Lopez-de-Ipina, Touch Computing: Simplifying Human to Environment Interaction through NFC Technology, Las Jornadas Cientificas sobre RFID, Ciudad Real, Nov. 21 to 23, 2007.

* cited by examiner

*Primary Examiner* — Gabriel Garcia
(74) *Attorney, Agent, or Firm* — Canon U.S.A., Inc. IP Division

(57) ABSTRACT

Systems and methods for sharing a printing device in an enterprise read information from a tag, wherein the information includes a printing device identifier and a refresh token, the printing device identifier is associated with a printing device, and the refresh token was issued to the printing device by a printing service; retrieve a printing service user identifier from a computer-readable medium; send the refresh token to the printing service; receive an access token from the printing service; send the access token, the printing device identifier, and the printing service user identifier to the printing service; receive an invitation associated with the printing service user identifier to access the printing device via the printing service; and send an acceptance of invitation associated with the printing service user identifier and a credential associated with the printing service user identifier to the printing service.

9 Claims, 12 Drawing Sheets

1200

| Printing Device | Refresh Token | Share Token |
|---|---|---|
| Printer Z | xA288KDJ90 | x983ID2JF83 |

FIG. 12

SYSTEMS AND METHODS FOR ENTERPRISE SHARING OF A PRINTING DEVICE

BACKGROUND

1. Field

The present disclosure relates to systems and methods for sharing a printing device in an enterprise environment.

2. Background

Some printing devices are capable of communicating with a distributed printing service (e.g., a cloud printing service) without the use of a proxy. These printing devices may be capable of self-registration with a distributed printing service, and may receive print jobs from the distributed printing service without the use of a proxy (e.g., a computing device that operates a driver for the printing device and that mediates communication between the printing device and the distributed printing service).

SUMMARY

In one embodiment, a method for sharing a printing device in an enterprise comprises reading information from a tag, wherein the information includes a printing device identifier and a refresh token, wherein the printing device identifier is associated with a printing device, and wherein the refresh token was issued to the printing device by a printing service, retrieving a printing service user identifier from a computer-readable medium, sending the refresh token to the printing service, receiving an access token from the printing service, sending the access token, the printing device identifier, and the printing service user identifier to the printing service, receiving an invitation associated with the printing service user identifier to access the printing device via the printing service, and sending an acceptance of invitation associated with the printing service user identifier and sending a credential associated with the printing service user identifier to the printing service.

In one embodiment, one or more computer-readable media store instructions that, when executed by one or more computing device, cause the one or more computing devices to perform operations comprising reading information from a tag, wherein the information includes a printing device identifier and a first credential, wherein the printing device identifier is associated with a printing device, sending the first credential to the printing service, receiving a second credential from the printing service, retrieving a printing service user identifier from a computer-readable medium, and sending the second credential, the printing device identifier, and the printing service user identifier to the printing service.

In one embodiment, a system for sharing a printing device in an enterprise comprises one or more computer-readable media, a tag reader, a network interface configured to allow communication with one or more other systems and devices, one or more processors configured to cause the system to read tag information from a tag, extract a first credential from the tag information, send the first credential to an enterprise device, receive a second credential from the enterprise device, send the second credential to a printing service, receive a third credential from the printing service, and send the third credential, a share request, and a printing service user identifier to the printing service.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 12 illustrates an example embodiment of a share entry.

DESCRIPTION

The following disclosure describes certain explanatory embodiments. Additionally, the explanatory embodiments may include several novel features, and a particular feature may not be essential to practice the systems and methods described herein.

Figure 1:
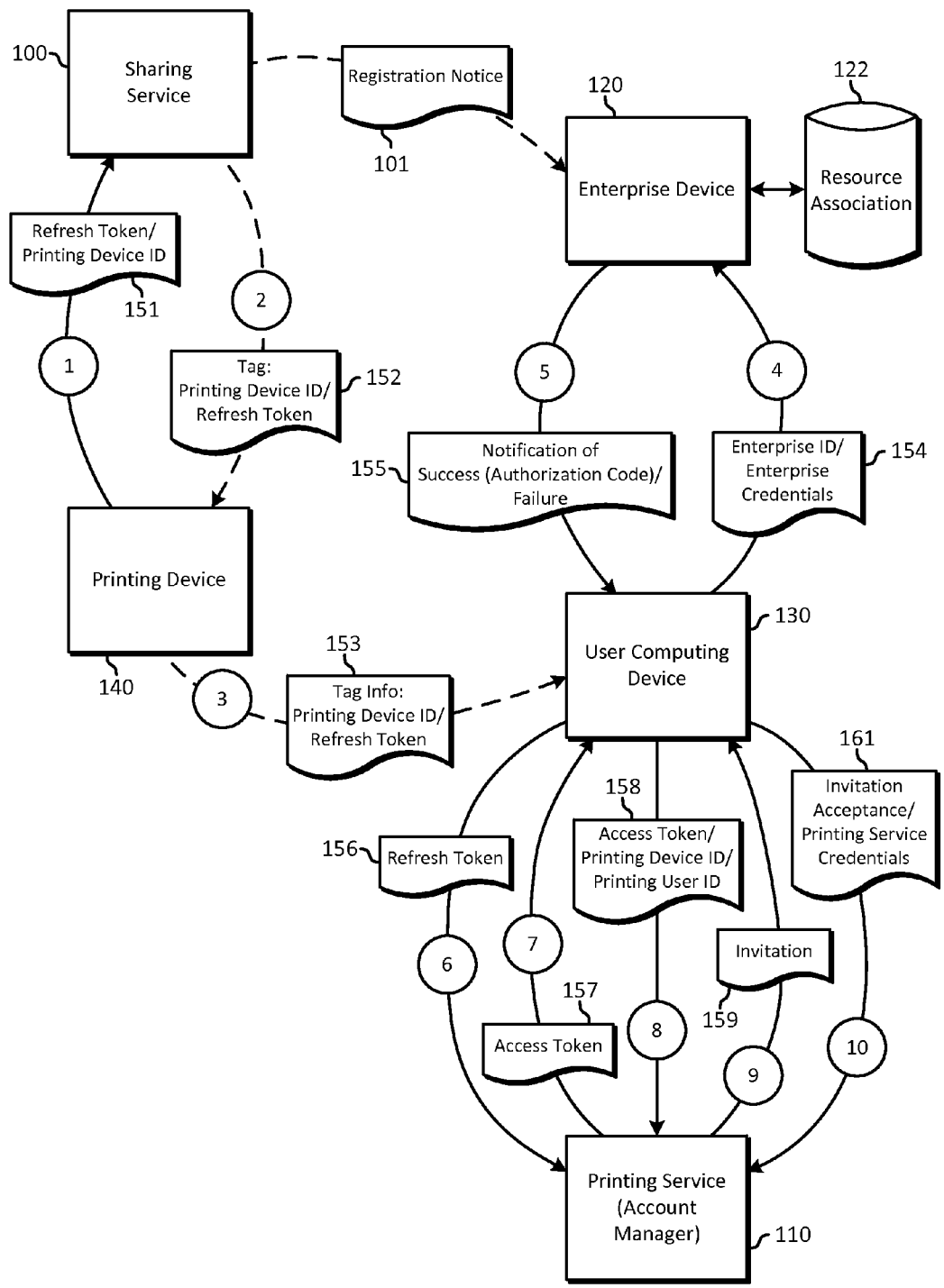
FIG. 1 is a block diagram that illustrates an example embodiment of a system for enterprise sharing of a distributed printing service self-registering printing device.

FIG. 1 is a block diagram that illustrates an example embodiment of a system for enterprise sharing of a distributed printing service self-registering printing device. Also, other embodiments of the system shown in FIG. 1 may alter stages 1-10, for example by adding additional stages, removing stages, changing the order of the stages, and performing the operations of the stages with different devices. The system includes a sharing service 100 (which includes one or more devices) that may be managed by an independent hardware vendor ("IHV"), a printing service 110 (which may be a distributed printing service (e.g., a cloud printing service) and which includes one or more devices), an enterprise device 120 (which includes one or more devices), a user computing device 130 operating an application (the application may be distributed by the printing device vendor) that allows configuration with the enterprise device 120, and a distributed printing service self-registering printing device 140 (also referred to herein as "printing device 140"). The organization associated with the enterprise device 120 may be a company, a university, a government entity, a charitable organization, etc.

The printing device 140, when activated, is configured to self-register with the printing service 110, and the printing service 110 issues a printing token (e.g., a public-key based token, a shared-secret based token, a refresh token, an access token) to the printing device 140. An account manager device associated with the printing service 110 may manage the issuance of and confirmation of tokens. The printing device 140 and the printing service 110 communicate via one or more networks. The owner of the printing device 140 may associate the printing device 140 with a printing user identifier (an identifier is also referred to herein as an "ID") of the owner and may inform the enterprise device 120 that the printing device 140 is available for use by other users of the enterprise device 120. The printing user identifier is an identifier (e.g., email address, phone number or other number, social identifier, name) that is recognized by the printing service 110. The printing user identifier may not have been created expressly for the printing service. Also, the sharing service 100 may be configured to send a registration notice 101 to the enterprise device 120 that includes the identifier of the printing device. The enterprise device 120 adds the identifier of the printing device 140 (also referred to herein as the "printing device ID") to a list of available printing devices in a database of resource association 122.

The system allows a user to print jobs on the printing device 140 via the printing service 110. When the printing device 140 has been successfully shared with a user, a user computing device 130 associated with the user (e.g., by the user's credentials) can send a print job to the printing device 140 via the printing service 110. Since the user computing device 130 needs to send the print job only to the printing service 110 (which then sends the print job to the printing device 140), the print job does not need to travel through a proxy device operating on behalf of the printing device 140, and the printing device 140 and the user computing device 130 do not need to directly communicate with one another (e.g., may operate on different networks). Also, the user computing device 130 may not need to install additional software (e.g., a driver). Furthermore, the user computing device 130 may not be able to print to the printing device 140 if the user computing device 130 is moved too far away from the printing device 140 (e.g., the distance between the devices exceeds a predetermined threshold, such as a range of near field communication). Therefore, sharing the printing device 140 with different devices may be simplified, since a new device does not need to establish direct communication with the printing device 140 (e.g., via a wired connection (serial cable, USB, etc.) or a wireless connection (802.11, Bluetooth, etc.)) or install custom software (drivers, etc.).

To share the printing device 140 after registration with the printing service 110, in stage 1 the printing device 140 sends a refresh token/a printing device ID 151 to the sharing service 100. Though this embodiment uses a refresh token (e.g., a refresh token issued according to the OAuth 2.0 standard), other embodiments may use other tokens or credentials. In response, the sharing service 100 generates and sends information describing a tag 152 to the printing device. The tag 152 indicates the printing device ID and the refresh token. The tag may be an optically-readable tag (e.g., a bar code (e.g., linear barcode, matrix barcode), plaintext, a photo, a watermark, microtext, a hologram) and may encrypt information. The tag may be a near-field communication (also referred to herein as "NFC") circuit (either a powered circuit or an unpowered circuit). The printing device 140 may print the tag 152 onto a medium (e.g., paper, card, plastic) and/or configure an NFC circuit (e.g., integrated circuit) according to the received tag 152. A tag 152 may be attached to a surface of the printing device 140. Additionally, in other embodiments the tag 152 may be generated by other devices and/or means. For example, the information describing the tag 152 may be sent to another device, which may generate a physical implementation of the tag 152 (e.g., printout, NFC tag), and the tag 152 may then be positioned at a desired location (e.g., positioned convenient to the printing device 140). The sharing service 100 may also send a registration notice 101 to the enterprise device 120.

In stage 3, tag information 153, including the printing device ID and the refresh token, is acquired from the tag by a user computing device 130. The tag information 153 may be acquired by an optical image capturing device (e.g., camera, bar code reader) or a NFC communication device of the user computing device 130. In stage 4, the application operating on the user computing device 130 is redirected to the enterprise device 120 to validate the user's enterprise ID/enterprise credentials 154. For example, the application on the user computing device 130 may be redirected to an enterprise interface (e.g., browser page) that receives enterprise credentials for the enterprise device 120. The enterprise device 120 validates the received enterprise ID and enterprise credentials and, in stage 5, returns a notification 155. If the validation is successful and the enterprise user has permission to use the printing device 140, the notification 155 includes an authorization code. If the validation is unsuccessful the notification 155 indicates failure. The application running on the user computer 130 may be developed by the printer hardware vendor with the configuration necessary to encode and/or read the tag and access the printing service. However, the application may be further configured and distributed by an enterprise system administrator: this configuration may include an application_key and an application_key_secret which will be used in an OAuth authorization flow when accessing the enterprise API to determine whether the user has enough privilege to access the printing device 140.

In stage 6, an application operating on the user computing device 130 sends the refresh token 156 (and may also send the printing device ID and/or a client secret (e.g., a string, other data)) to the printing service 110. In response, in stage 7 the printing service 110 sends an access token 157 (e.g., an access token defined by the OAuth 2.0 standard) to the user computing device 130. The access token may be generated based on the refresh token 156, and may be specific to the printing device 140 (e.g., may indicate the printing device ID). Also, in some embodiments the access token 157 grants its holder authority to act as the owner of the printing device 140. Therefore, once the user computing device 130 has the access token 157, the user computing device 130 can initiate any of the operations that the owner of the printing device 140 can, including adding users, changing device settings, etc.

Next, in stage 8, the user computing device 130 sends the access token/printing device ID/printing user ID 158 to the printing service 110 in a request to add the printing user ID to the users permitted to use the printing device 140. In stage 9, an invitation 159 is generated for the associated printing user ID, and the invitation 159 is sent to the user computing device 130 (e.g., by the user computing device 130 polling the printing service 110 on behalf of the printing user ID, sending the invitation 159 to an account associated with the printing user ID). Finally, in stage 10, the user computing device 130 sends an invitation acceptance/printing service credentials 161 to the printing service 110. The printing service credentials demonstrate that the user computing device 130 is authorized to accept the invitation on behalf of the user associated with the printing user ID. By using the printing user ID, the user computing device 130 may then print jobs on the printing device 140 and communicate with the printing device 140 via the printing service 110, without sending the print data through the enterprise device 120.

For example, in one embodiment a printing device 140, whose ID is Printer 1, receives a refresh token from a printing service 110. The printing device 140 sends the refresh token and "Printer 1" to a sharing service 100. The sharing service 100 generates a tag that, when read, indicates a refresh token and "Printer 1". The tag may be printed onto paper by the printing device 140, or implemented in an NFC tag. The printed tag/NFC tag is then positioned near the printing device 140.

Meanwhile, a user computing device 130 sends an enterprise ID ("User 4") and enterprise credentials to an enterprise device 120. In reply, the enterprise device 120 sends the user computing device 130 an authorization code and/or enterprise-issued token. Next, the user computing device 130 may prompt the user to enter a printing user ID, which is "User X" in this example, or the enterprise device 120 may store "User X" in a database, where "User X" is associated with "User 4", and send "User X" to the user computing device 130. The user computing device 130 validates the authorization code and/or enterprise-issued token and, if valid, sends the refresh token to the printing service 110. The printing service 110 replies by sending the access token to the user computing device 130.

Next, the user computing device 130 sends the access token, "Printer 1", "User X", and a share request to the printing service 110. The printing service 110 then validates the access token. If the validation is successful, the printing service 110 considers the share request to have been issued by the owner of the printing device 140 and sends an invitation to User X. The user computing device 130 then replies with an acceptance from User X and the printing service credentials of User X.

For example, the printing service 110 may send the invitation in an email. The user computing device 130 may access the email and send an acceptance to the printing service 110. If the printing service 110 operates the email account, which may be associated with User X, the user computing device 130 may first provide the printing service credentials in order to access the email account, and then retrieve the email and send the acceptance of the invitation via the email account. Acting on behalf of User X, the user computing device 130 may then send a print job to the printing device 140 by sending the printing job to the printing service 110. The printing service 110 may perform the operations of a driver, for example reconfiguring the print job to a format readable by the printing device 140, and the printing service 110 forwards the print job to the printing device 140.

In some embodiments, an application running on the user computing device 130 may be customized by an enterprise administrator of the enterprise device 120 to validate credentials. When the user computing device 130 makes a request to share a printing device, the application uses an enterprise account manager service to validate the current user's enterprise credentials, and the application shares the printing device 140 with the printing user ID.

Figure 2:
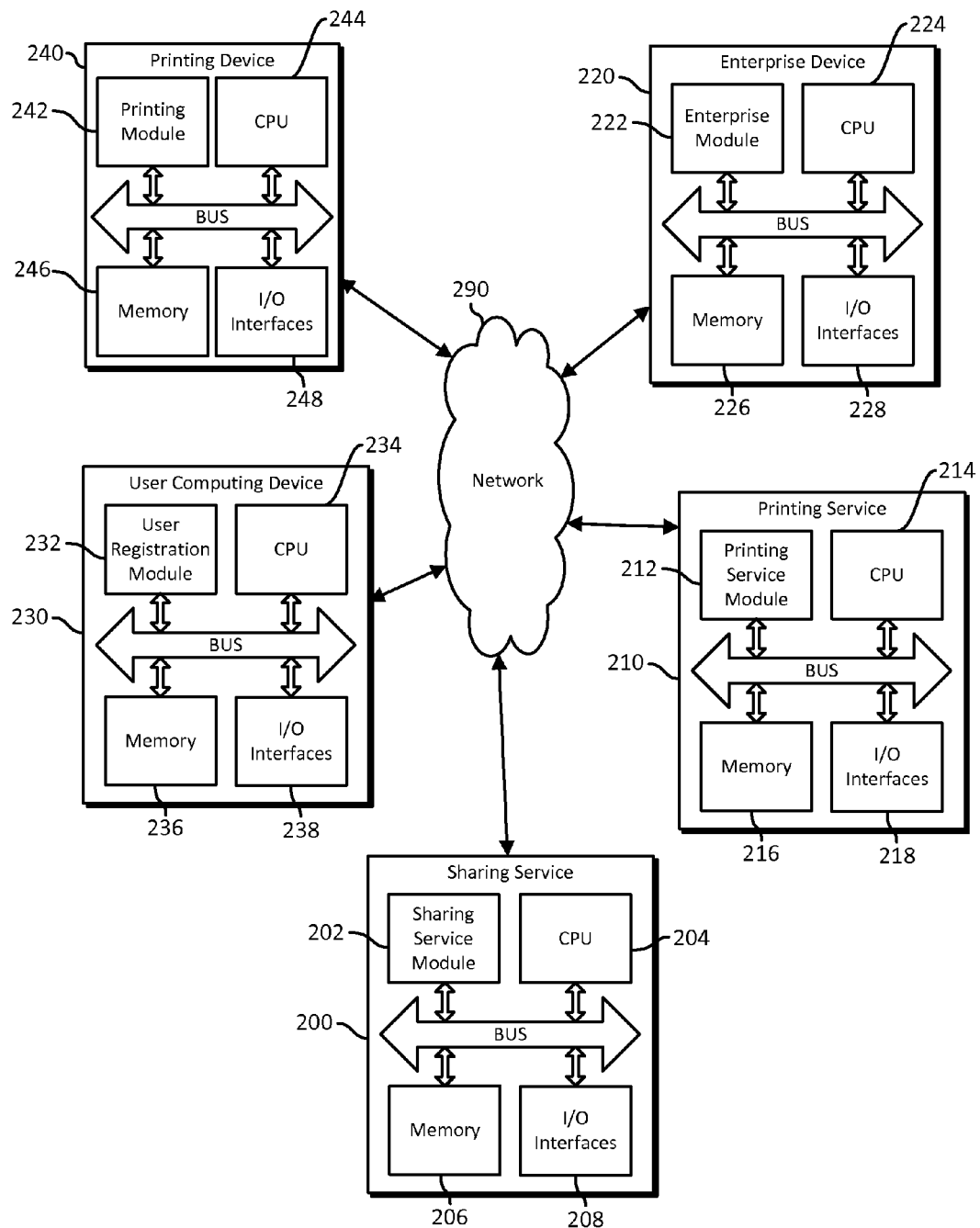
FIG. 2 is a block diagram that illustrates an example embodiment of a system for enterprise sharing of a distributed printing service self-registering printing device.

FIG. 2 is a block diagram that illustrates an example embodiment of a system for enterprise sharing of a distributed printing service self-registering printing device. The system includes a sharing service 200, a printing service 210, an enterprise device 220, a user computing device 230, and a printing device 240. The sharing service 200, the printing service 210, the enterprise device 220, and the user computing device 230 each respectively include one or more computing devices. Computing devices include, for example, desktops, laptops, servers, mainframes, personal digital assistants, tablet computers, cellular phones (including smart phones), etc. The computing devices may communicate via one or more networks 290, and the one or more networks 290 include one or more of a LAN, a WAN, a personal network, the Internet, a wired network, and a wireless network. One or more of the sharing service 200, the printing service 210, and the enterprise device 220, may operate in a distributed or cloud computing environment, where computing, software, platforms, or infrastructure may be provided as a service. Therefore, the sharing service 200, the printing service 210, the enterprise device 220, the printing device 240, and the user computing device 230 may be physically located miles apart.

The sharing service 200 includes a CPU 204, storage/RAM 206, and I/O interfaces 208. The CPU 204 includes one or more computer processors, such as single core or multi-core central processing units and/or micro-processing units. The CPU 204 may be incorporated in a stand-alone apparatus or in a multi-component apparatus. The CPU 204 may implement computer-executable instructions and/or control the implementation of computer-executable instructions by other members of a device (e.g., the sharing service 200).

A memory 206 includes one or more computer-readable media, and thus is configured to store computer-readable data and/or computer-executable instructions. The memory 206 may include, for example, one or more of a magnetic disk (e.g., a flexible disk (floppy disk), a hard disk, redundant array of independent disks (RAID)), an optical disc (e.g., CD, DVD, Blu-ray), a magneto-optical disk, a micro-drive, a read-only memory (ROM), solid state memory (e.g., random access memory (RAM), DRAM, SRAM, flash memory, video RAM (VRAM), a nonvolatile memory card, a solid state drive), erasable programmable read only memory (EPROM), electrically erasable programmable read only memory (EEPROM), a magnetic tape or card, and an optical card.

The sharing service 200 also includes one or more I/O interfaces 208. The I/O interfaces 208 provide communication interfaces to input and output devices, which may include a keyboard, a display device, a mouse, one or more controls (e.g., buttons, switches, dials), a touch screen, a scanner, a microphone, a drive, and a network (either wired or wireless).

Additionally, the sharing service 200 includes a sharing service module 202. A module includes instructions that may be executed by a computing device to cause the computing device to perform certain operations, though for purposes of description a module may be described as performing the operations. Modules may include logic, computer-readable data, and/or computer-executable instructions and may be implemented in software (e.g., Assembly, C, C++, C#, Java, BASIC, Perl, Visual Basic), firmware, and/or hardware. Other embodiments may include additional or less modules, combine modules into fewer modules, or divide the modules into more modules. Depending on the embodiment, one or more of the sharing service module 202 and the other modules shown in FIG. 2 (the printing service module 212, the enterprise module 222, the user registration module 232, and the printing module 242) may be executed by one or more computing devices to implement part or all of the methods described herein. The sharing service module 202 may associate printing devices with tokens (e.g., refresh tokens, share tokens), generate tags, receive printing device IDs and refresh tokens, retrieve access tokens form a printing service, and send share requests to a printing service.

The printing service 210 includes a CPU 214, a memory 216, I/O interfaces 218, and a printing service module 212. The printing service module 212 operates a printing service that allows users to send print jobs to printing devices via one or more networks 290. The printing service module 212 directs print jobs to printing devices, converts the respective formats of print jobs, communicates with an account manager associated with the printing service 210, and/or manages users and printing devices (including printing device 240).

The enterprise device 220 includes a CPU 224, memory 226, I/O interfaces 228, and an enterprise module 222. The enterprise module 222 manages printing devices (e.g., printing device 240) that are available for use by members of the organization associated with the enterprise device 220. The enterprise module 222 may associate owners with printing devices, maintain data that indicates which printing devices a particular user is allowed to access, associate enterprise IDs with respective printing user IDs, validate users, associate printing user IDs with respective enterprise IDs, communicate with the sharing service 200, and/or track the printing devices that a user has been invited to use by the sharing service 200.

The user computing device 230 includes a CPU 234, memory 236, I/O interfaces 238, and a user registration module 232. The user registration module 232 (which may implement a mobile application, e.g., a mobile "app") extracts one or more of a token and a printing device ID from tags (e.g., a captured image of a tag, barcode data from a scanned tag, information received from an NFC tag), sends enterprise IDs and enterprise credentials to the enterprise device 220, receives enterprise validations, receives printing device IDs (for example, from an enterprise or via user input), sends printing user IDs, tokens, and printing device IDs to the sharing service 200, receives invitations to use a printing device, and/or sends invitation acceptances and printing service credentials to the printing service 210.

The printing device 240 includes a CPU 244, memory 246, I/O interfaces 248, and a printing module 242. The printing module 242 self-registers the printing device 240 with the printing service 210, receives one or more tokens from the printing service, sends one or more tokens to the sharing service 200, receives print jobs, and/or or receives one or more tags from the sharing service 200. The printing device 240 also includes software and hardware for printing.

Figure 3:
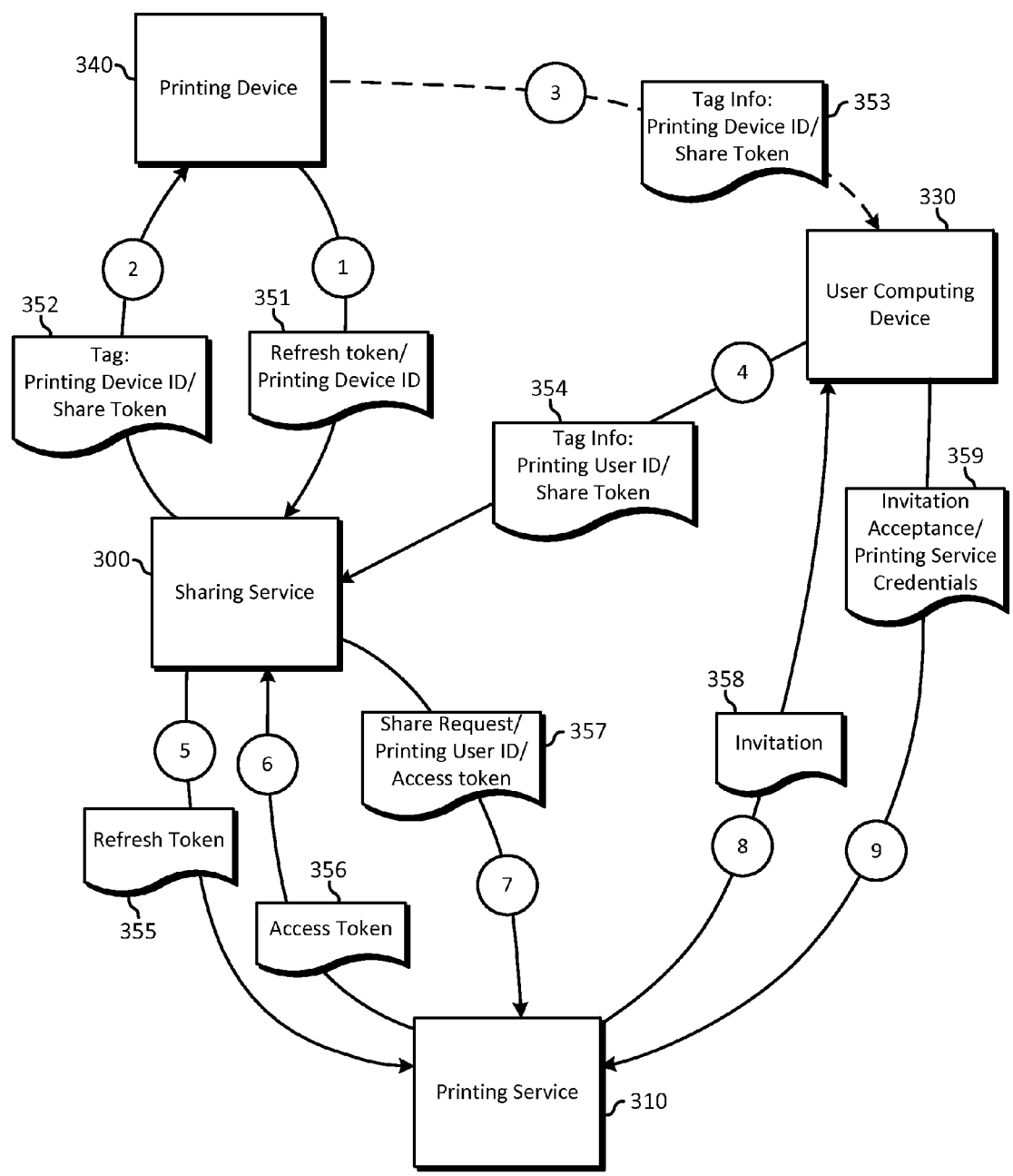
FIG. 3 is a block diagram that illustrates an example embodiment of a system for enterprise sharing of a distributed printing service self-registering printing device.

FIG. 3 is a block diagram that illustrates an example embodiment of a system for enterprise sharing of a distributed printing service self-registering printing device. After the printing device 340 self-registers with the printing service 310, in stage 1 the printing device 340 sends a refresh token/printing device ID 351 to a sharing service 300. The sharing service 300 generates a share token, a tag 352 (which indicates the printing device ID and the share token), and a share entry (an embodiment of a share entry is show in FIG. 12) that associates the share token with the received refresh token and the printing device ID. In stage 2, the sharing service 300 sends the tag 352 to the printing device 340. Next, in stage 3, a user computing device 330 reads the tag info 353 (e.g., is brought within range of an NFC tag, captures an image of a tag), which includes the printing device ID/share token. In stage 4, the user computing device 330 sends the tag info 354 to the sharing service 300. The sharing service 300 determines the refresh token associated with the received share token and, in stage 5, sends the refresh token 355 to the printing service 310. The printing service 310 returns an access token 356 to the sharing service 300 in stage 6. After receiving the access token 356, in stage 7 the sharing service 300 sends a share request/printing user ID/access token 357 to the printing service 310.

Next, in stage 8, the printing service 310 sends an invitation 358, for the printing user ID to access the printing device, to the user computing device 330. In response, in stage 9 the user computing device 330 sends an invitation acceptance/printing service credentials 359 to the printing service 310. The user computing device 330 will then be able to send print jobs to the printing device 340 via the printing service 310. Additionally, the user computing device 330 may share the printing device 340 with guest privileges, and the sharing may be automatically disabled after a specific interval of time and/or after the user computing device 330 leaves the proximity of the printing device 340.

Figure 4:
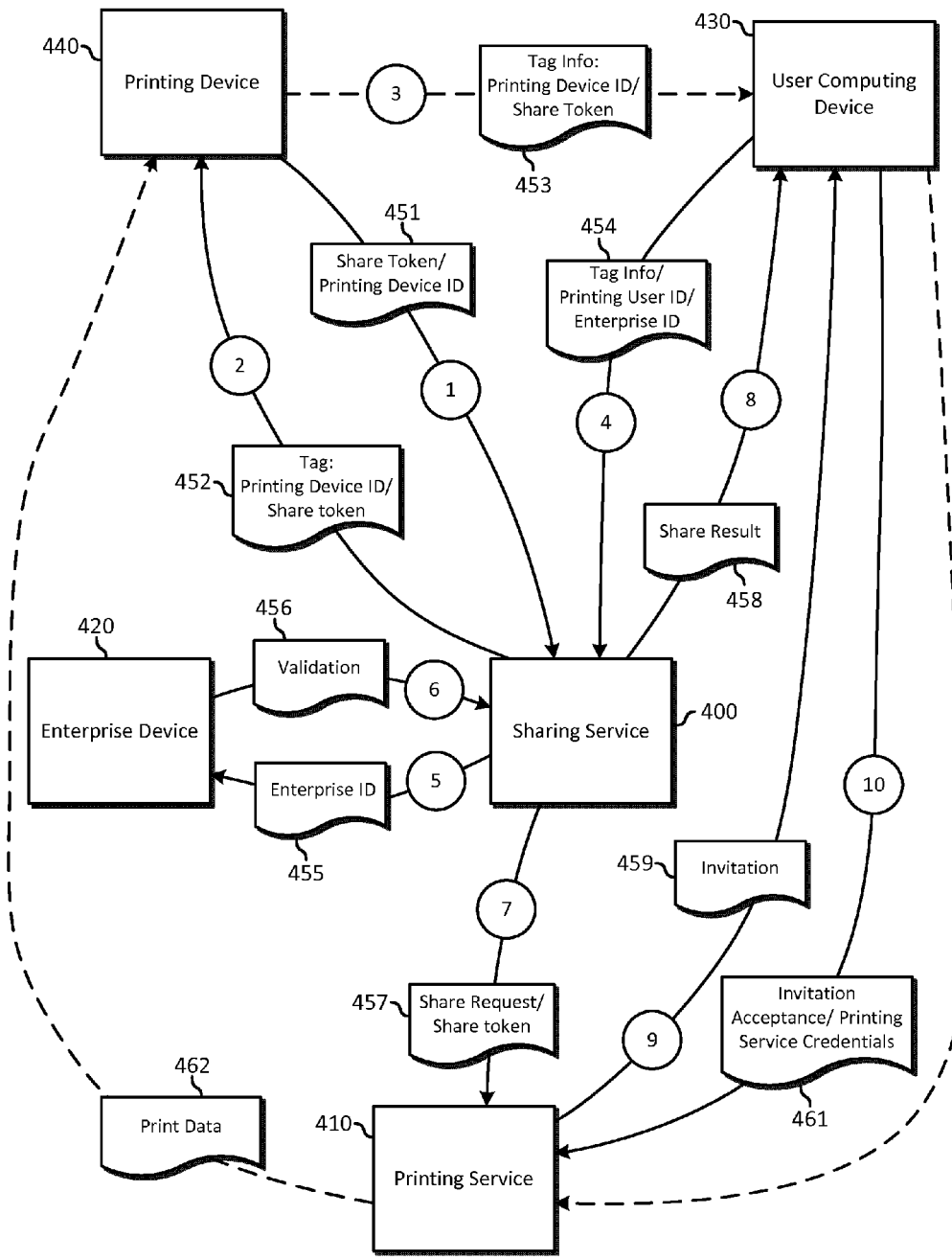
FIG. 4 is a block diagram that illustrates an example embodiment of a system for enterprise sharing of a distributed printing service self-registering printing device.

FIG. 4 is a block diagram that illustrates an example embodiment of a system for enterprise sharing of a distributed printing service self-registering printing device. In this embodiment, the sharing service 400 is configured to communicate with an account managing service for the enterprise device 420. In stage 1, after registration with the printing service 410 (in which the printing device 440 receives a share token from the printing service 410), the printing device 440 sends the share token/printing device ID 451 to the sharing service 400, which stores the share token and the printing device ID. Based on the share token and the printing device ID 451, the sharing service 400 generates a tag 452 that indicates the printing device ID and the share token. The sharing service 400 then sends the tag 452 to the printing device 440 in stage 2. In stage 3, the user computing device 430 acquires the tag info 453 (which indicates the printing device ID and the share token), and, in stage 4, the user computing device 430 sends the tag info/printing user ID/enterprise ID 454 (and, in some embodiments, enterprise credentials) to the sharing service 400. In stage 5, the sharing service 400 sends the enterprise ID 455 (which may include enterprise credentials) to the enterprise device 420. If the enterprise ID is successfully validated, the enterprise device 420 sends a notification of the validation 456 to the sharing service 400 in stage 6.

In response to receiving the notification of the validation 456, in stage 7 the sharing service 400 sends a share request/share token 457 (which may include the printing user ID and the printing device ID) to the printing service 410. Also, in stage 8, the sharing service 400 sends a share result 458 to the user computing device 430. The share result 458 indicates that the share request was sent to the printing service 410. In stage 9, an invitation 459 is sent to the user computing device 430 by the printing service 410. Finally, in stage 10, the user computing device 430 sends an invitation acceptance/printing service credentials 461 to the printing service 410. The user computing device 430 may then send print data 462 to the printing device 440 via the printing service 410 without sending the print data 462 to the enterprise device 420 or the sharing service 400.

Figure 5:
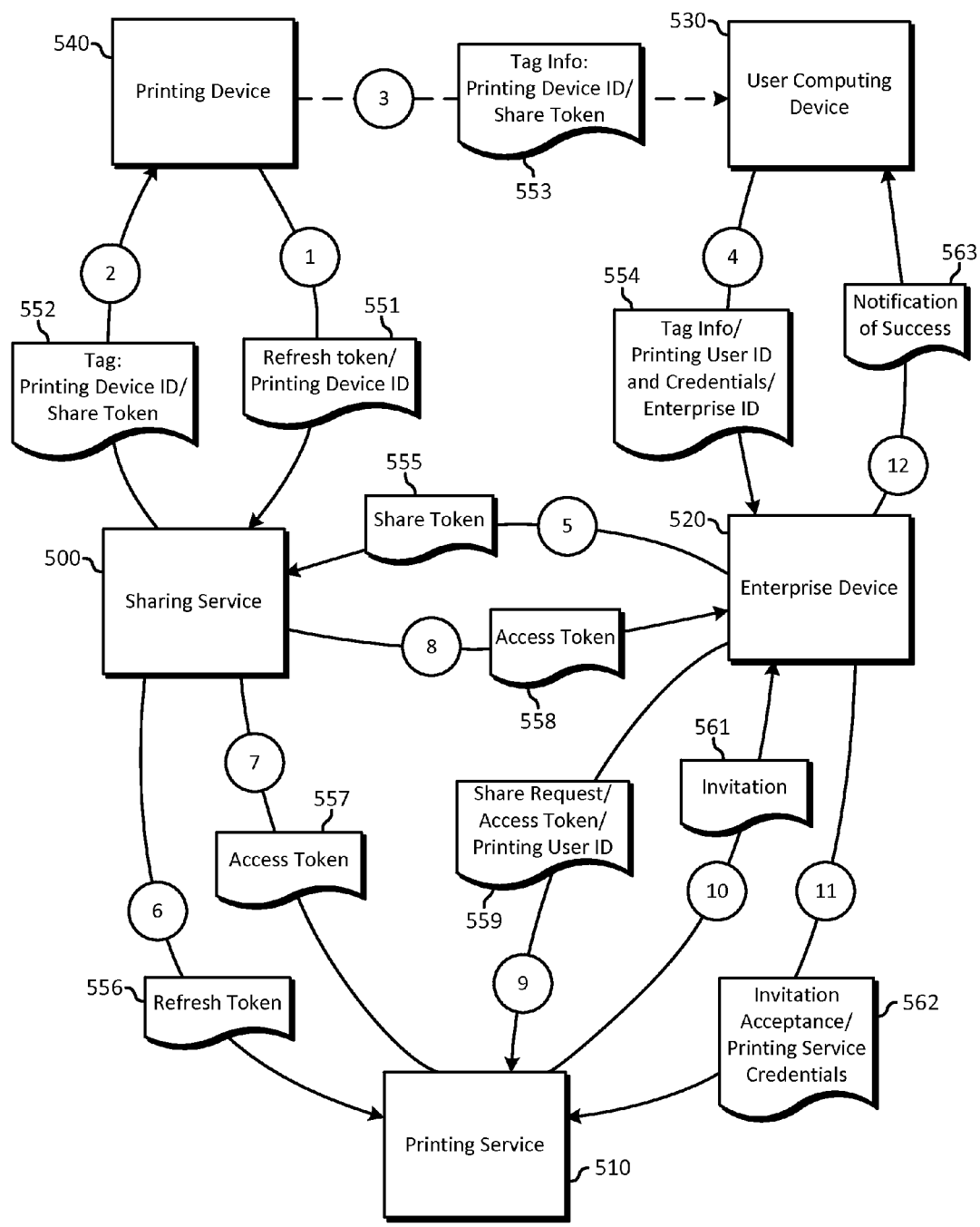
FIG. 5 is a block diagram that illustrates an example embodiment of a system for enterprise sharing of a distributed printing service self-registering printing device.

FIG. 5 is a block diagram that illustrates an example embodiment of a system for enterprise sharing of a distributed printing service self-registering printing device. In stage 1, a printing device 540 sends a refresh token/printing device ID 551 to a sharing service 500. The sharing service 500 generates a share token and associates the share token with the refresh token. The sharing service 500 then generates a tag 552 that includes the printing device ID and the share token, and sends the tag 552 to the printing device 540 in stage 2. A physical implementation (e.g., hard copy, NFC circuit) of the tag is generated and positioned (e.g., near or on the printing device 540). A user computing device 530 is brought close enough to the physical implementation of the tag to read the tag information (e.g., optically read, NFC) and, in stage 3, the user computing device 530 reads the tag information 553 (including the printing device ID and the share token).

Next, the user computing device 530 acquires (e.g., from memory, from user input) a printing user ID, printing service credentials, and an enterprise ID. In stage 4, the user computing device 530 sends the tag information/printing user ID and credentials/enterprise ID 554 to an enterprise device 520. In stage 5, the enterprise device 520 sends the share token 555 to the sharing service 500, which retrieves the refresh token associated with the share token 555. Afterwards, in stage 6, the sharing service 500 sends the refresh token 556 to the printing service 510. In stage, 7, the printing service 510 returns an access token 557 to the sharing service 500, which, in stage 8, forwards the access token 558 to the enterprise device 520. After receiving the access token 558, the enterprise device 520 sends a share request/the access token/printing user ID 559 to the printing service 510 in Stage 9. In stage 10, the printing service 510 sends an invitation 561 to the enterprise device 520. Next, in stage 11, the enterprise device 520 sends an invitation acceptance/printing service credentials 562 to the printing service 510. Finally, in stage 12, the enterprise device 520 sends a notification of success 563 to the user computing device 530.

Figure 6:
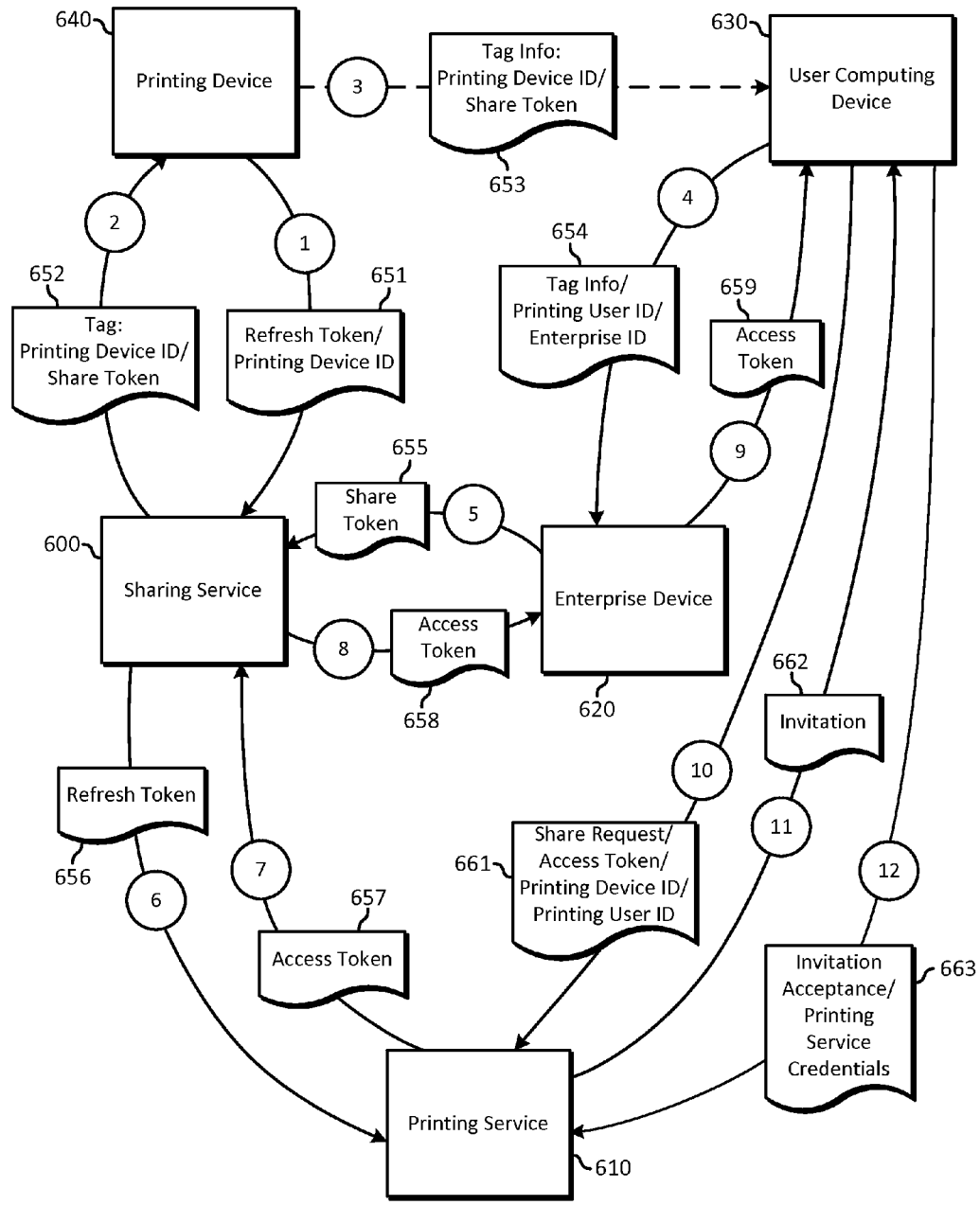
FIG. 6 is a block diagram that illustrates an example embodiment of a system for enterprise sharing of a distributed printing service self-registering printing device.

FIG. 6 is a block diagram that illustrates an example embodiment of a system for enterprise sharing of a distributed printing service self-registering printing device. In stage 1, after registration, a printing device 640 sends a refresh token/printing device ID 651 to a sharing service 600. The sharing service 600 generates a share token associated with the received refresh token and generates a tag 652 that includes the printing device ID and the share token. In stage 2, the sharing service 600 sends the tag 652 to the printing device 640. After an implementation of the tag 652 is generated and positioned, in stage 3 a user computing device 630 reads the tag information 653, including the printing device ID/share token. Next, in stage 4, the user computing device 630 sends the tag information/printing user ID/enterprise ID 654 (which may also include enterprise credentials) to an enterprise device 620. The enterprise device 620 may validate the enterprise ID, and, in stage 5, the enterprise device 620 sends the share token 655 to the sharing service 600. The sharing service 600 identifies the refresh token 656 associated with the share token 655, and, in stage 6, sends the associated refresh token 656 to the printing service 610. In reply, in stage 7 the printing service 610 sends an access token 657 to the sharing service 600, and, in stage 8, the sharing service 600 forwards the access token 658 to the enterprise device 620, which in turn forwards the access token 659 to the user computing device 630 in stage 9.

Next, in stage 10, the user computing device 630 sends a share request/the access token/printing device ID/printing user ID 661 to the printing service 610. The printing service 610 replies in stage 11 by sending an invitation 662 to the user computing device 630. Finally, in stage 12 the user computing device 630 sends an invitation acceptance/printing service credentials 663 to the printing service 610.

Figure 7:
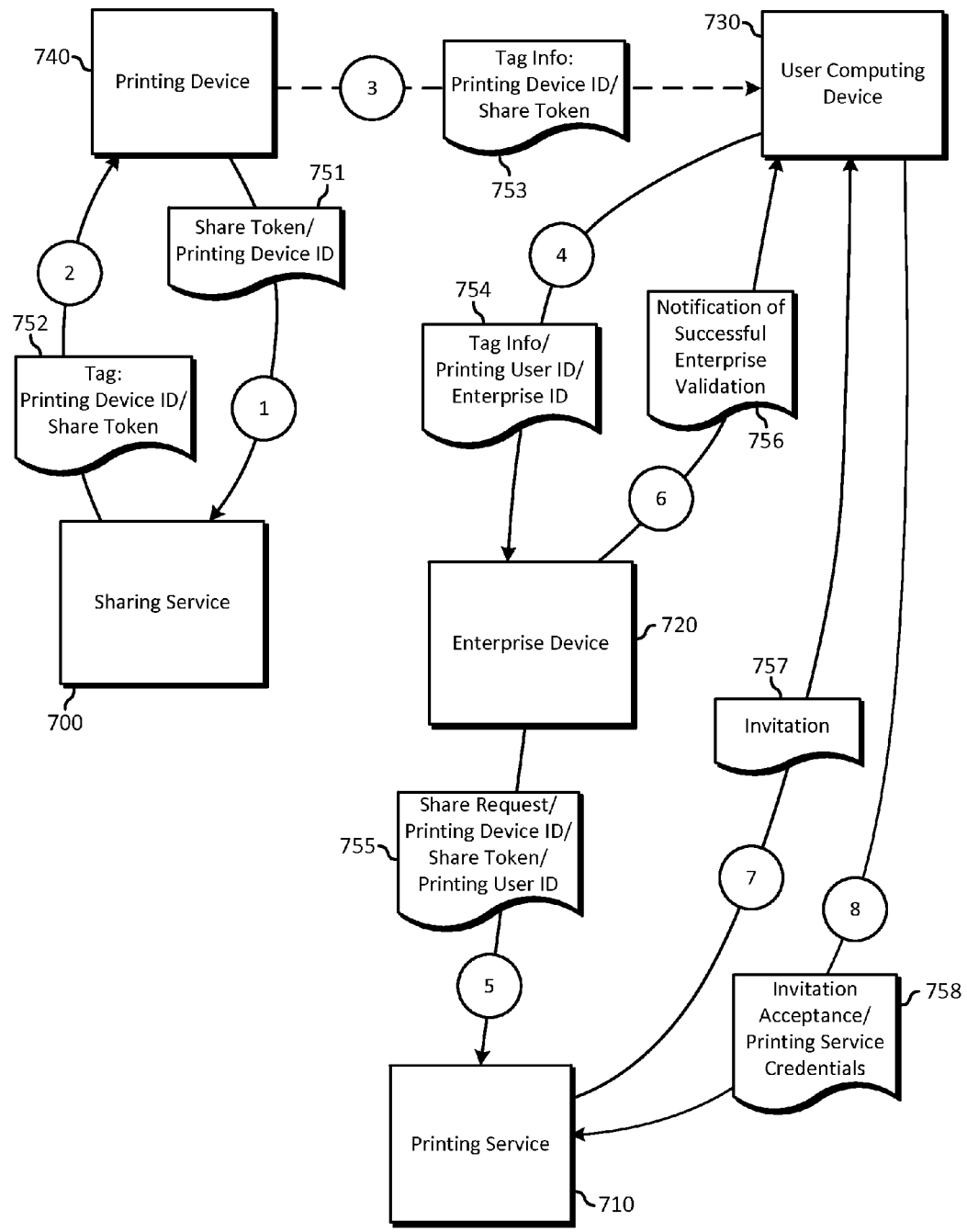
FIG. 7 is a block diagram that illustrates an example embodiment of a system for enterprise sharing of a distributed printing service self-registering printing device.

FIG. 7 is a block diagram that illustrates an example embodiment of a system for enterprise sharing of a distributed printing service self-registering printing device. In stage 1, a printing device 740 sends a share token/printing device ID 751 to a sharing service 700. The sharing service 700 generates a tag 752 that includes the printing device ID and the share token and, in stage 2, sends the tag 752 to the printing device 740. In stage 3, a user computing device 730 reads the tag information 753, including the printing device ID and the share token. The user computing device 730 acquires a printing user ID and an enterprise ID, and, in stage 4, the user computing device 730 sends the tag information/printing user ID/enterprise ID 754 (which may also be accompanied by enterprise credentials) to an enterprise device 720.

The enterprise device 720 determines if the enterprise ID and any accompanying enterprise credentials are valid. If valid, in stage 5 the enterprise device 720 sends a share request/printing device ID/share token/printing user ID 755 to the printing service 710. Also, in stage 6 the enterprise device 720 sends a notification of successful enterprise validation 756 to the user computing device 730. Additionally, in stage 7 the printing service 710 sends an invitation 757 to the user computing device 730, and, in stage 8, the user computing device 730 sends an invitation acceptance/printing service credentials 758 to the printing service 710.

Figure 8:
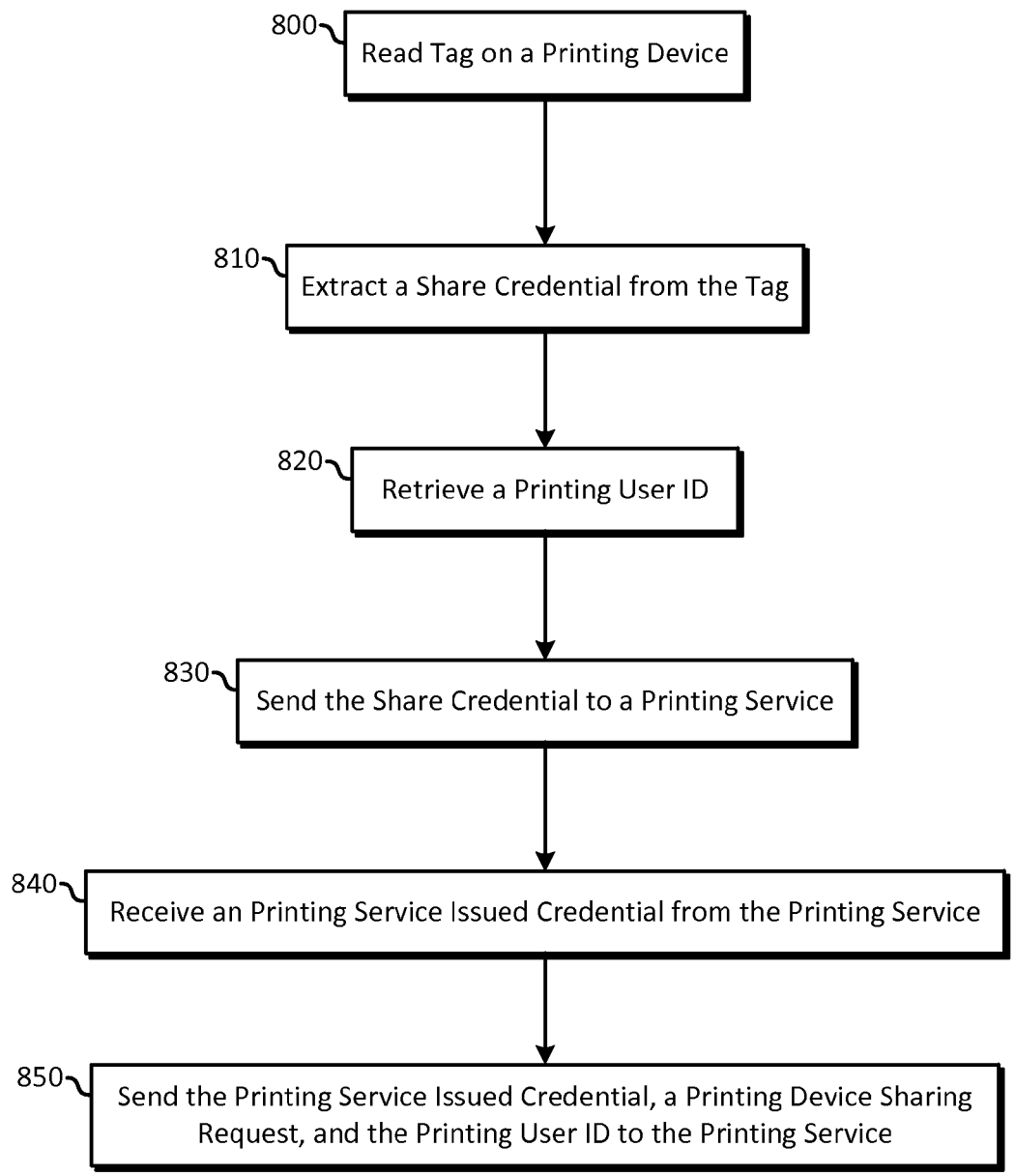
FIG. 8 is a flow diagram that illustrates an example embodiment of a method for enterprise sharing of a distributed printing service self-registering printing device.

FIG. 8 is a flow diagram that illustrates an example embodiment of a method for enterprise sharing of a distributed printing service self-registering printing device. The blocks shown in FIG. 8 may be performed by one or more computing devices, for example an enterprise device, a user computing device, and a sharing service. Flow starts in block 800, where a tag on a printing device is read (e.g., by a camera, an NFC circuit, a barcode scanner). Next, in block 810, a share credential, which identifies a printing device, is extracted from the tag. Flow proceeds to block 820, where a printing user ID is retrieved (e.g., from memory, from user input). Following, in block 830, the share credential is sent to a printing service, and in response, in block 840 a printing service issued credential, which also identifies the printing device, is received from the printing service. Next, in block 850, the following are sent to the printing service: the printing service issued credential, a printing device sharing request, and the printing user ID.

Figure 9:
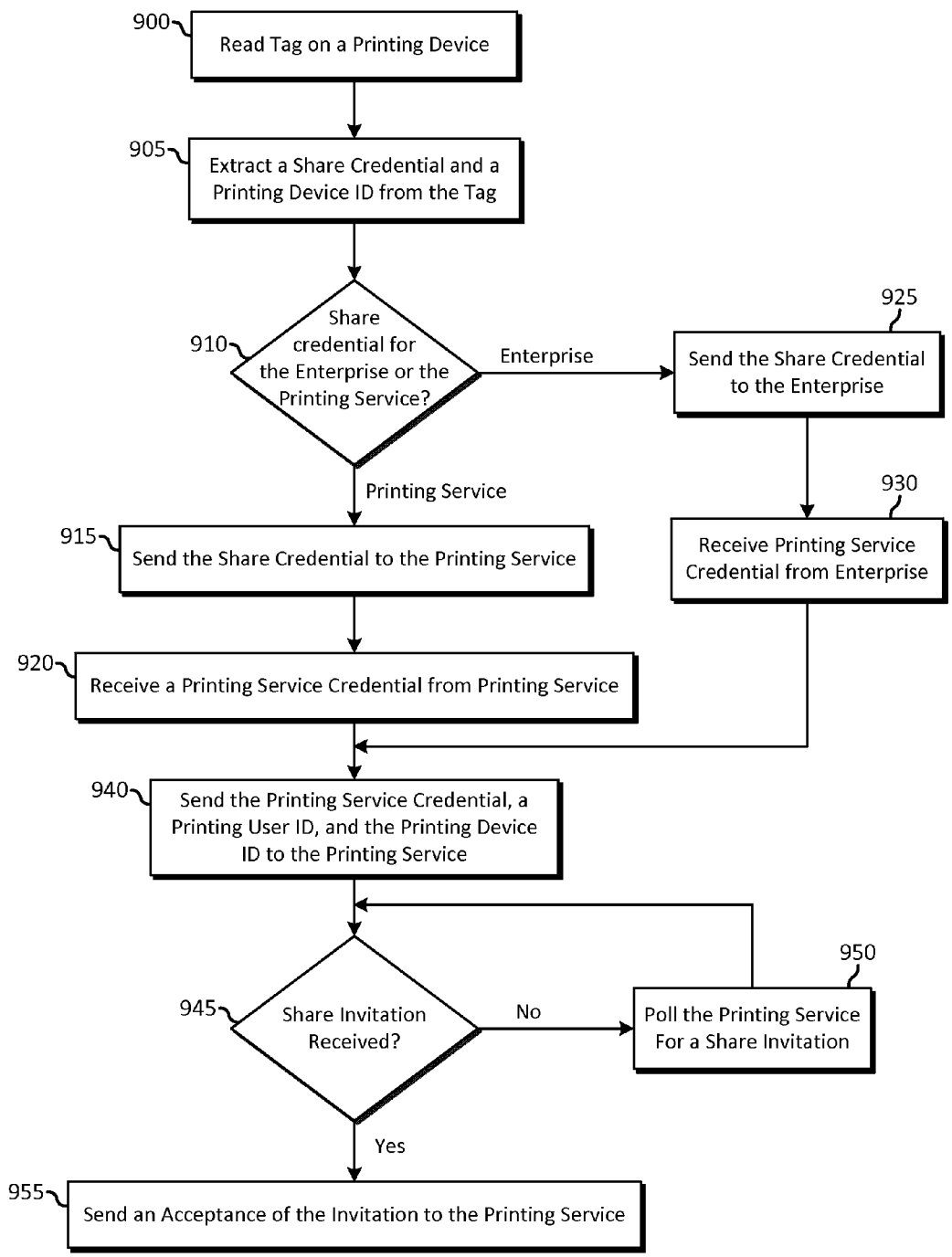
FIG. 9 is a flow diagram illustrates an example embodiment of a method for enterprise sharing of a distributed printing service self-registering printing device.

FIG. 9 is a flow diagram illustrates an example embodiment of a method for enterprise sharing of a distributed printing service self-registering printing device. In this embodiment, either a printing service or an enterprise device may generate a share credential. Flow starts in block 900, where a tag on a printing device is read. Next, in block 905, a share credential and printing device ID are extracted from the tag. In block 910, it is determined if the share credential is associated with an enterprise device or a printing service. If the credential is associated with a printing service, flow proceeds to block 915. In block 915, the share credential is sent to the printing service. Next, in block 920, a printing service credential is received from the printing service, and flow then proceeds to block 940.

If in block 910 the share credential was determined to be for the enterprise, flow then proceeds to block 925, where the share credential is sent to the enterprise device. In response, in block 930 a printing service credential is received from the enterprise device, and flow then proceeds to block 940.

In block 940, the printing service credential, a printing user ID, and the printing device ID are sent to the printing service. Next, in block 945, it is determined if a share invitation has been received. If a share invitation has not been received, flow proceeds to block 950, where the printing service is polled for a share invitation (e.g., by sending a message, by checking an email account), and afterwards flow returns to block 945. If a share invitation has been received, flow proceeds to block 955, where an acceptance of the invitation is sent to the printing service.

Figure 10:
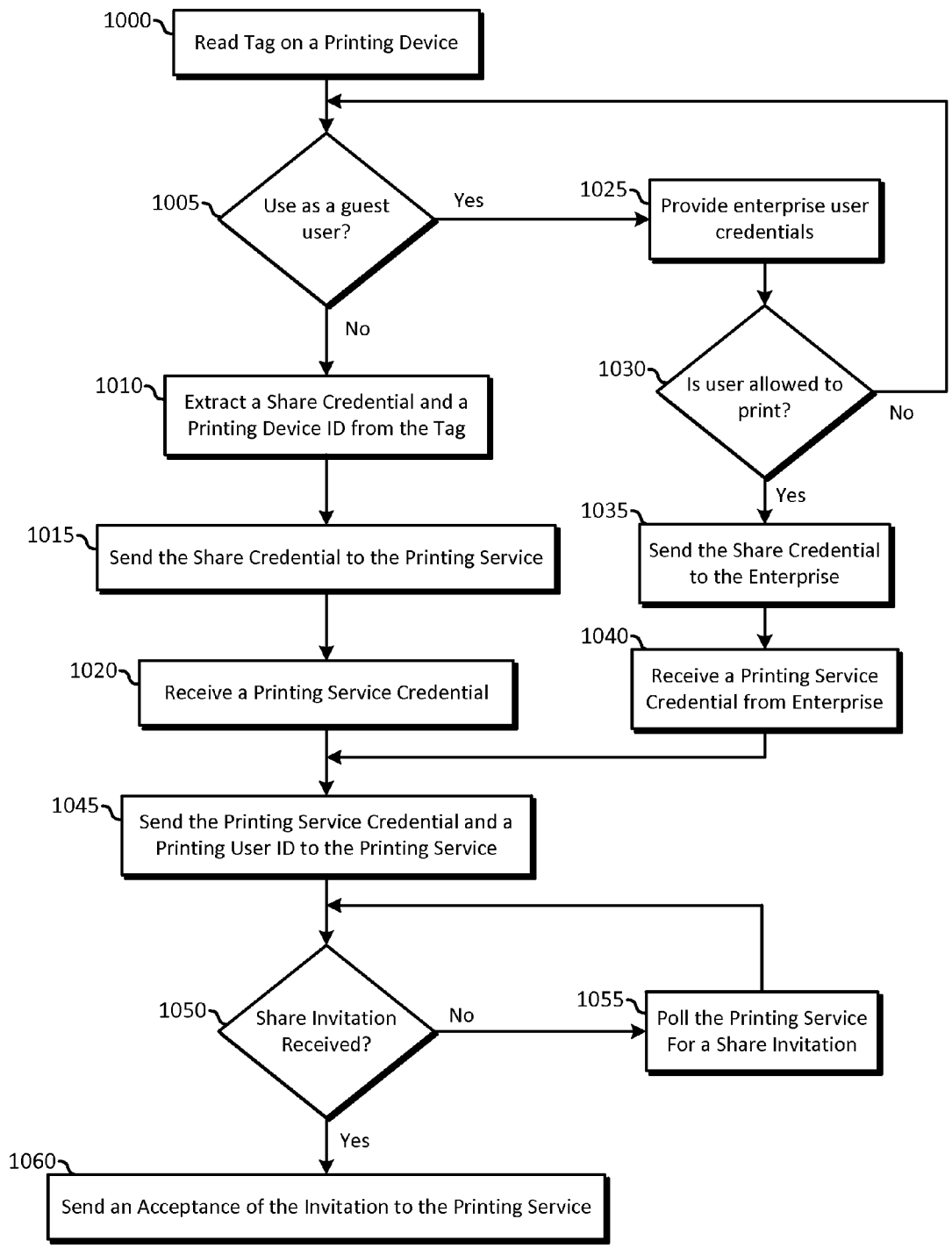
FIG. 10 is a flow diagram that illustrates an example embodiment of a method for enterprise sharing of a distributed printing service self-registering printing device.

FIG. 10 is a flow diagram that illustrates an example embodiment of a method for enterprise sharing of a distributed printing service self-registering printing device. Flow starts in block 1000, where a tag is read on a printing device. Next, in block 1005, it is determined if the printing device will be used as a guest user. If not (e.g., if the user is a normal user, if the printing device does not support guest users), then flow proceeds to block 1010, where a share credential and a printing device ID are extracted from the tag. Next, in block 1015, the share credential is sent to a printing service, and, in block 1020, a printing service credential is received in response. Flow then proceeds to block 1045.

However, if in block 1005 it is determined that the printing device will be used as a guest user, then flow proceeds to block 1025, where enterprise user credentials are provided to the enterprise device. Moving to block 1030, it is determined if the user is allowed to print. If the user is not allowed to print, flow returns to block 1005, where flow waits for another tag read/request from a user. However, if the user is allowed to print, then flow proceeds to block 1035, where the share credential is extracted from the tag and sent to the enterprise device. Afterwards, in block 1040 a printing service credential is received from the enterprise device. Flow then proceeds to block 1045.

In block 1045, the printing service credential and a printing user ID are sent to the printing service. Next, in block 1050, it is determined (e.g., by a user computing device, an enterprise device, a sharing service) if a share invitation has been received. If not, flow moves to block 1055, where the printing service is polled for a share invitation, and flow returns to block 1050. If a share invitation has been received, flow proceeds to block 1060, where an acceptance of the invitation is sent to the printing service.

Figure 11:
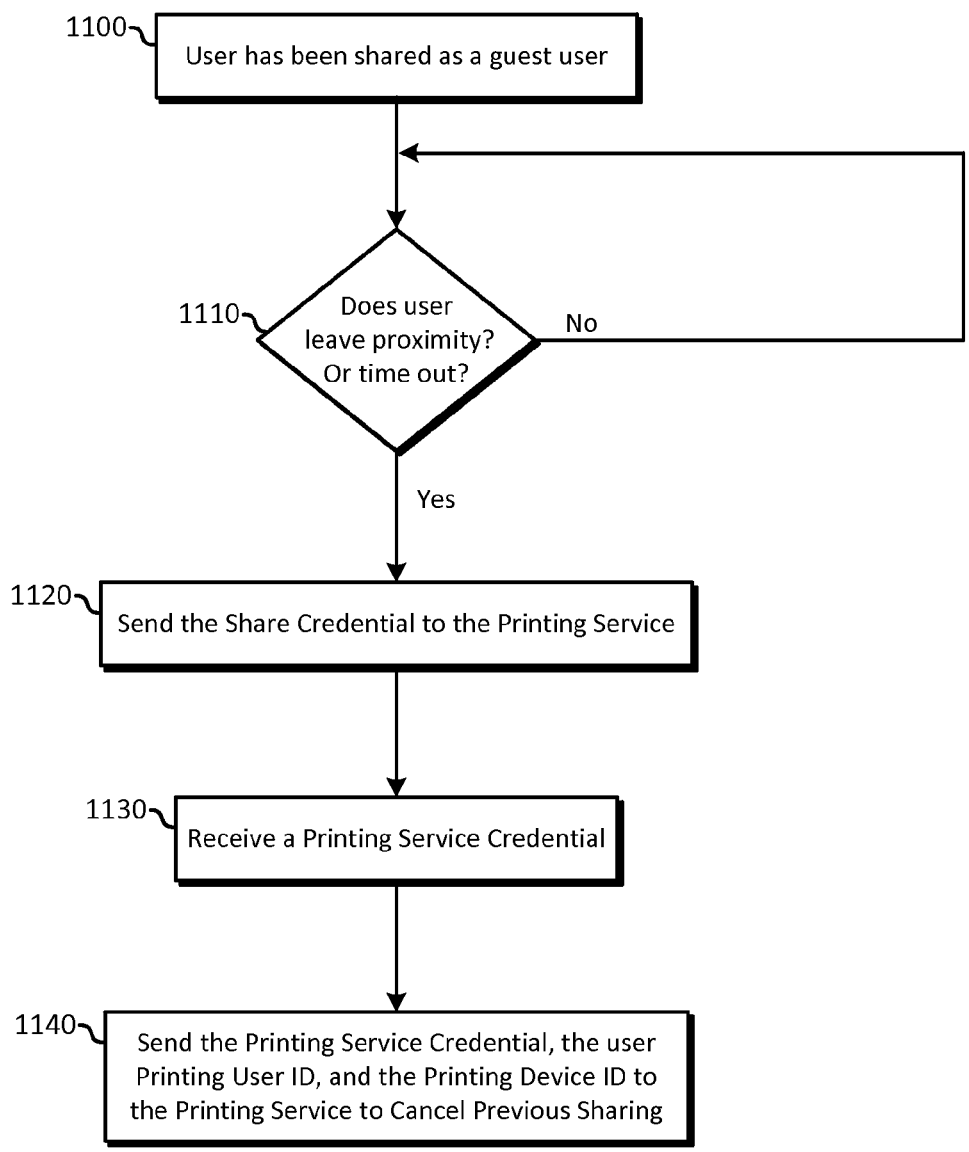
FIG. 11 is a flow diagram that illustrates an example embodiment of a method for enterprise sharing of a distributed printing service self-registering printing device.

FIG. 11 is a flow diagram that illustrates an example embodiment of a method for enterprise sharing of a distributed printing service self-registering printing device. The method shown in FIG. 11 may be performed to cancel sharing privileges with a user who has been given permission to share a printing device. Flow starts in block 1100, where a user has been shared as a guest user. Flow moves to block 1110, where it is determined if a user has left the proximity of the printing device (or a tag) or if a time out has occurred. If no to either, flow returns to block 1110. However, if the user has left the proximity or a timeout has occurred, flow proceeds to block 1120, where the share credential is sent to the printing service. In response, in block 1130 a printing service credential is received from the printing service. Finally, in block 1140, the printing service credential, the printing user ID, and the printing device ID are sent to the printing service with a request to cancel a previous sharing. In response, the printing service cancels the previous sharing.

FIG. 12 illustrates an example embodiment of a share entry 1200. The share entry 1200 associates a printing device ID, a refresh token, and a share token. Thus, a sharing service may use the share entry 1200 when share token x983ID2JF83 is received to determine that the received share token is associated with refresh token xA288KDJ90 and Printer Z.

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the systems and/or devices perform the operations of the above-described embodiments when executing the computer-executable instructions read from the one or more storage media. Also, an operating system on the one or more systems and/or devices may implement the operations of the above described embodiments. Thus, the computer-executable instructions and/or the one or more storage media storing the computer-executable instructions therein constitute an embodiment.

Any applicable computer-readable storage medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a storage medium for the computer-executable instructions. The computer-executable instructions may be written to a computer-readable storage medium provided on a function-extension board inserted into the device or on a function-extension unit connected to the device, and a CPU provided on the function-extension board or unit may implement the operations of the above-described embodiments.

This disclosure has provided a detailed description with respect to particular explanatory embodiments. It is understood that the scope of the appended claims is not limited to the above-described embodiments and that various changes and modifications may be made without departing from the scope of the claims.

What is claimed is:

1. A method for sharing a printing device in an enterprise, the method comprising:
   reading information from a tag at a computing device, wherein the information includes a printing device identifier and a refresh token, wherein the printing device identifier is associated with a printing device, and wherein the refresh token was issued to the printing device by a printing service;
   obtaining, at the computing device, a printing service user identifier from a computer-readable medium;
   sending the refresh token to the printing service from the computing device;
   receiving an access token from the printing service at the computing device;
   sending the access token, the printing device identifier, and the printing service user identifier to the printing service from the computing device;
   receiving, at the computing device, an invitation associated with the printing service user identifier to access the printing device via the printing service; and
   sending an acceptance of invitation associated with the printing service user identifier and sending a credential associated with the printing service user identifier to the printing service from the computing device.

2. The method of claim 1, further comprising:
   receiving a refresh token and the printing device identifier from the printing device; and
   generating the tag.

3. The method of claim 1, wherein the tag includes one or more of a QR code, a barcode, and a near-field communication tag.

4. The method of claim 1, further comprising:
   retrieving an enterprise user identifier from a computer-readable medium; and
   sending the printing device identifier and the enterprise user identifier to an enterprise service device.

5. The method of claim 4, further comprising:
   sending the printing service user identifier to the enterprise service device, wherein the enterprise service device associates the printing service user identifier with the enterprise user identifier.

6. The method of claim 4, further comprising:
   receiving an enterprise token from the enterprise service device, wherein the sending of the access token, the printing device identifier, and the printing service user identifier to the printing service is performed in response to receiving the enterprise token.

7. The method of claim 1, wherein the printing device is configured to self-register with the printing service, and wherein the printing service is a distributed printing service.

8. One or more computer-readable storing instructions that, when executed by one or more computing devices, cause the one or more computing devices to perform operations comprising:

- reading information from a tag at a computing device, wherein the information includes a printing device identifier and a refresh token, wherein the printing device identifier is associated with a printing device, and wherein the refresh token was issued to the printing device by a printing service;
- obtaining, at the computing device, a printing service user identifier from a computer-readable medium;
- sending the refresh token to the printing service from the computing device;
- receiving an access token from the printing service at the computing device;
- sending the access token, the printing device identifier, and the printing service user identifier to the printing service from the computing device;
- receiving, at the computing device, an invitation associated with the printing service user identifier to access the printing device via the printing service; and
- sending an acceptance of invitation associated with the printing service user identifier and sending a credential associated with the printing service user identifier to the printing service from the computing device.

9. A system for sharing a printing device in an enterprise, the system comprising:

- one or more network interfaces;
- a computer-readable medium; and
- one or more processors that are coupled to the one or more network interfaces and the computer-readable medium and that are configured to cause the system to
  - read information from a tag at a computing device, wherein the information includes a printing device identifier and a refresh token, wherein the printing device identifier is associated with a printing device, and wherein the refresh token was issued to the printing device by a printing service;
  - obtain, at the computing device, a printing service user identifier from a computer-readable medium;
  - send the refresh token to the printing service from the computing device;
  - receive an access token from the printing service at the computing device;
  - send the access token, the printing device identifier, and the printing service user identifier to the printing service from the computing device;
  - receive, at the computing device, an invitation associated with the printing service user identifier to access the printing device via the printing service; and
  - send an acceptance of invitation associated with the printing service user identifier and sending a credential associated with the printing service user identifier to the printing service from the computing device.

* * * * *